US008719929B2

(12) United States Patent
Le et al.

(10) Patent No.: US 8,719,929 B2
(45) Date of Patent: May 6, 2014

(54) METHOD AND DEVICE FOR RECOGNIZING ATTACKS ON A SELF-SERVICE MACHINE

(75) Inventors: Dinh Khoi Le, Paderborn (DE); Michael Nolte, Brakel (DE); Adrian Slowik, Paderborn (DE)

(73) Assignee: Wincor Nixdorf International GmbH (DE)

( * ) Notice: Subject to any disclaimer, the term of this patent is extended or adjusted under 35 U.S.C. 154(b) by 239 days.

(21) Appl. No.: 13/121,304

(22) PCT Filed: Sep. 2, 2009

(86) PCT No.: PCT/EP2009/061319
§ 371 (c)(1), (2), (4) Date: Mar. 28, 2011

(87) PCT Pub. No.: WO2010/037610
PCT Pub. Date: Apr. 8, 2010

(65) Prior Publication Data
US 2011/0179485 A1 Jul. 21, 2011

(30) Foreign Application Priority Data
Sep. 30, 2008 (DE) ........................ 10 2008 049 599

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC ........................................................ 726/22

(58) Field of Classification Search
USPC ........................................................ 726/22
See application file for complete search history.

(56) References Cited

U.S. PATENT DOCUMENTS

| | | | | |
|---|---|---|---|---|
| 7,451,919 | B2 * | 11/2008 | Savage | 235/379 |
| 7,469,239 | B2 * | 12/2008 | Musman | 706/46 |
| 7,942,315 | B2 * | 5/2011 | He et al. | 235/379 |
| 2007/0080215 | A1 | 4/2007 | Ramachandran et al. | |
| 2008/0285578 | A1 * | 11/2008 | DeLay et al. | 370/412 |

FOREIGN PATENT DOCUMENTS

| | | | |
|---|---|---|---|
| DE | 10 2006 049 518 | A1 | 4/2008 |
| WO | WO-2006/079769 | A1 | 8/2006 |

OTHER PUBLICATIONS

Notification of Transmittal of Translation of the International Preliminary Report on Patentability for PCT/EP2009/061319 (Apr. 14, 2011).

* cited by examiner

*Primary Examiner* — Dant Shaifer Harriman
(74) *Attorney, Agent, or Firm* — Harness, Dickey & Pierce, P.L.C.

(57) ABSTRACT

The invention relates to a method for recognizing attacks on at least one interface of a computer system, particularly a self-service machine, comprising: monitoring the interface in order to detect changes to the interface; if changes occur, the probability of an impermissible attack on the interface is determined based on the nature of the change; if the probability is above a defined threshold value, defensive measures are taken.

26 Claims, 3 Drawing Sheets

METHOD AND DEVICE FOR RECOGNIZING ATTACKS ON A SELF-SERVICE MACHINE

CROSS-REFERENCE TO RELATED APPLICATIONS

This application is a National Stage of International Application No. PCT/EP2009/061319, filed Sep. 2, 2009. This application claims the benefit and priority of German application 10 2008 049 599.9 filed Sep. 30, 2008. The entire disclosures of the above applications are incorporated herein by reference.

BACKGROUND

This section provides background information related to the present disclosure which is not necessarily prior art.

TECHNICAL FIELD

The invention relates to a method and a device for recognizing attacks on at least one self-service machine, in particular an attack on an automated teller machine.

Conventional self-service terminals are frequently encountered functioning as an automated teller machine or account statement printer. In order to operate said terminal, the user, or customer, requires a bank card that usually takes the form of a magnetic stripe card, which is read by a card reader, on which card data including personal customer and account data are stored. Unfortunately, manipulation at self-service terminals is being practiced to an increasing degree by third parties in order to illegally acquire these data. To do this, a special spying device is installed as unobtrusively as possible at the particular self-service terminal that essentially contains a small external card reader that is positioned as directly as possible in front of the actual card slot for the self-service terminal or of the actual card reader. When a customer inserts his bank card into the card reader of the self-service terminal, its magnetic stripe is also read by this external card reader, whereby the third party acquires the card data, in particular the customer and account data, making it possible for him to produce an illegal copy of the bank card. If the third party is additionally successful in spying out the PIN associated with the card, he can easily withdraw money from the account at automated teller machines using the counterfeit bank card and the PIN that has been obtained. In order to acquire this information, it is possible, for example, to install a counterfeit keypad over the actual keypad in order to acquire the keystrokes that have been made.

The fraudulent procedure described to spy out card data or customer information is described in industry circles as skimming or card abuse. One possibility for preventing it, or at least making it more difficult, is to generate a protective electromagnetic field that is suitable for compromising the read function of the magnetic card read head located in the spying device. To do this, the protective field must be generated, or take effect, precisely where the spying device is normally installed, that is to say in front of the slot of the "genuine" or actual card reader. In addition, the protective field must be sufficiently strong to ensure that the read function of the spying device is effectively interfered with or blocked and that the data can no longer be read by skimming the magnetic stripe card. Suitable approaches are known from DE 10 2006 049 518 A1.

However, it is not a simple matter to align or position such a protective field so precisely and also to adjust its field strength such that the read function of the actual card reader in the self-service terminal is not also interfered with by mistake.

The problem associated with all the known approaches is that they often react too sensitively when used as a stand-alone device and limit the functionality of the self-service machine.

SUMMARY OF THE INVENTION

The object of the invention is, therefore, to provide an improved protection device of the type described at the beginning for recognizing attacks with warnings permitting a higher accuracy rate.

A basic objective of the invention lies in modeling attack patterns in order to establish these models in the form of a concrete system of rules, then recognizing an attack using this system of rules.

A fact adapter is used to link up existing device drivers.

To do this, known threats and weak points are classified and modeled in rules. The fact adapter should be implemented in one possible embodiment through selected device drivers and image recognition mechanisms. In addition, the configuration and the system of rules itself should be protected by suitable mechanisms, such as certified encryption.

One possibility for providing information for the fact adapter lies in adapting an image recognition or image preprocessing system and integrating artificial intelligence components. After the training phase—also known as supervised learning—the AI component should be capable of identifying and classifying cases not recognized by the static system of rules from consolidated sensor signals.

Because of the vulnerability of the control panel, it is particularly exposed to manipulation since it represents the interface for "the general public". The discussions that follow refer for this reason to the components of the control panel, but are not limited thereto. It is likewise conceivable that network interfaces or other interfaces, such as USB, serial interfaces are monitored and incorporated into the system of rules by way of the fact adapter. Basically, a self-service system can be divided into systems accessible from the inside and from the outside. The components in the interior can often only be reached through interfaces as they have been described. The following system components and their system drivers are paramount in the following considerations, but the invention is not limited thereto: PIN pad (keypad for entering PIN), all card readers, cash dispensing drawer in all possible forms, monitor/display with soft key, touchscreen or surrounding buttons, protective barrier against speech recognition, ASKIM II anti-skimming module (see also DE 10 2005 043 317 B3).

Additional system components or sensors could be a clock, proximity sensor, temperature sensor, etc. Additionally, administration components can be taken into account that monitor and administer the self-service machines over a network. These components can, in certain cases, provide valuable information about the operating state of the self-service system (service operation, out of commission, standard operation, limited operation). Alarm information can be made available to downstream systems or users over a diagnostic platform. Reversing the process, the diagnostic platform provides events regarding system states.

As was already discussed above, the components of an automated teller machine can, in principle, be manipulated from the outside and/or from the inside. Only the area on the outside is initially considered in the threat analysis.

One situation serving as an example can be capturing the PIN by installing keypad overlays. This is a genuine threat that is known to have been implemented in attacks on PIN processing systems.

Alternatively, the PIN can spied out by mini-cameras that have been installed.

In the second step, a skimming module attachment in front of the card slot can be used in order to access the card data.

In addition to the recognized threats, the system and its components are examined for potential weak spots. The results can be documented in a system of rules.

EXAMPLE

The EPP can be placed lower by the application of force. In order to integrate the rule physically, a manipulation switch (removal switch) is planned that switches the self-service system to an out of commission state for some functions if force is applied. This information is naturally also sent to the fact adapter.

If one considers, for example, only the components accessible from the outside, the sources involve the card reader, the EPP, the cash dispensing drawer and the display with the operating buttons. They provide information or events that arise through direct interaction of the self-service users with the machine or events that arise as the result of a preceding interaction. These events are passed on to the software platform and, where necessary, also to the application.

In a first step, potential and necessary, possibly additional, sources of information within the delimited system should be identified. It can basically be determined that identified information sources provide events or information about a system state as input values for a recognition system. These input values are, for example, Boolean values. A model can be developed for these identified events/system states and their dependencies from which attack patterns can be derived. Context modeling of elementary patterns and events up to and including more complex patterns, form the basis for the pattern recognition of the anomaly recognition system.

Specifically it involves a method for recognizing attacks on a self-service machine that has a series of components, comprising the steps:

- monitoring the states and events of the components by a monitoring unit
- applying a system of rules stored on a memory system to the states and events through a processing unit that loads the rules from the memory system and receives the information from the monitoring unit;
- checking through the processing unit whether the system of rules has determined an attack in order to report said attack to a message system.

It must be noted: that the monitoring unit, the processing unit may be software or a combination of software and hardware that can run on a standard processor (a PC for example). The memory system can be a hard disc or similar.

The drawings described herein are for illustrative purposes only of selected embodiments and not all possible implementations, and are not intended to limit the scope of the present disclosure.

DETAILED DESCRIPTION OF THE PREFERRED EMBODIMENTS

Example embodiments will now be described more fully with reference to the accompanying drawings.

Figure 1:
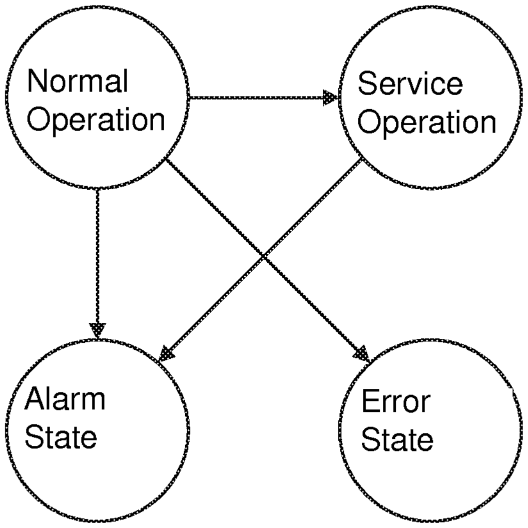
FIG. 1 shows the operating states of a self-service system.

FIG. 1 shows as an example the dependency of possible system states. An automated teller machine can switch from its normal operating state or from its service operating state into an alarm state. The change in system state depends on which events occur in which sequence. These events are in turn triggered by specific interactions by a user.

Figure 2:
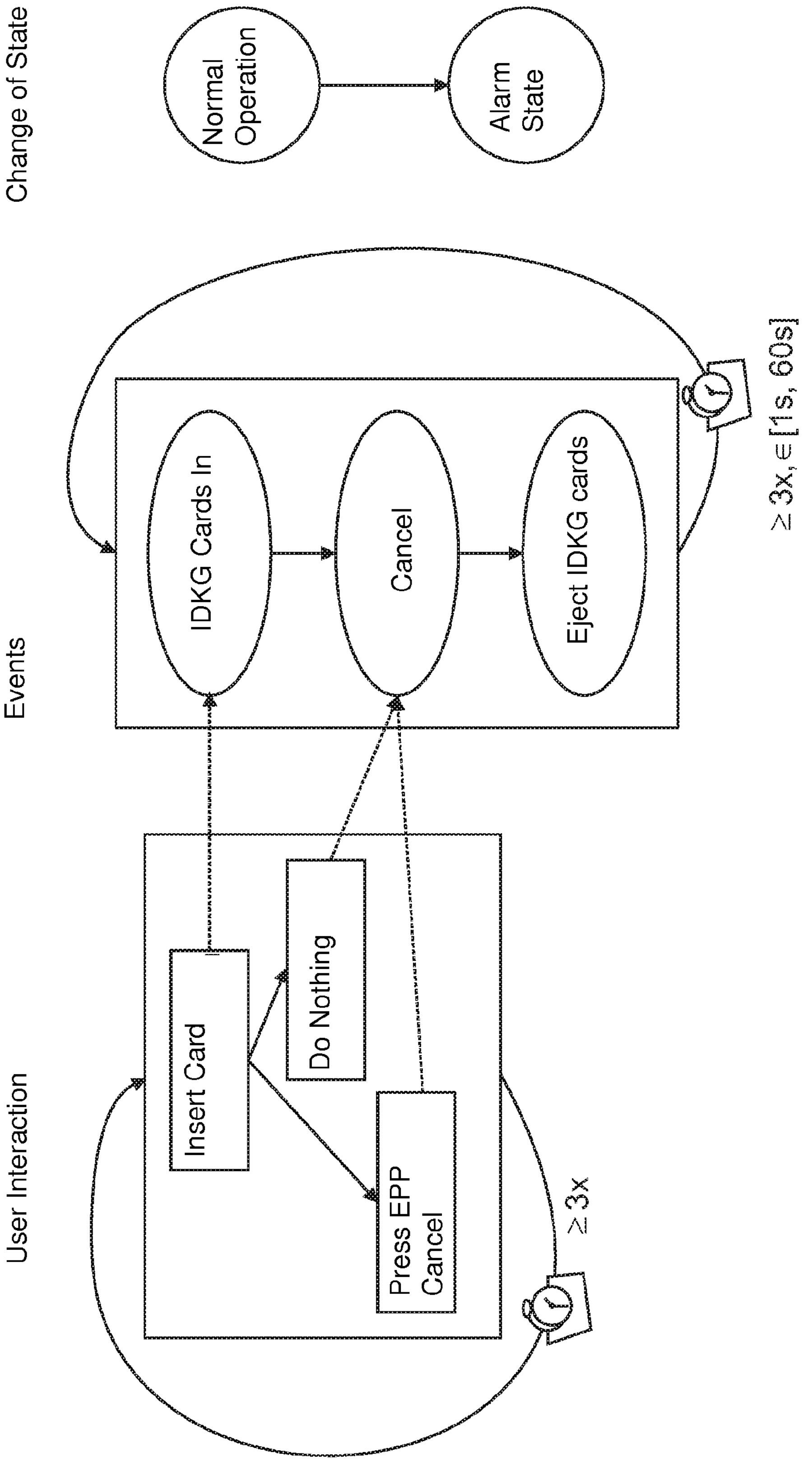
FIG. 2 shows a diagram illustrating the connection between user actions and system events.

In what follows, an example is shown in FIG. 2 of how user interactions, user actions, events from different system components and, as a consequence, system state changes for an attack scenario are linked.

The scenario shown deals with a suspected skimmer test. After a skimming module has been installed, a skimmer test is usually carried out by the attacker. The interaction comprises the following actions: insert card, after a certain time the card is returned, either by pressing the Cancel button on the keypad (EPP) or by waiting. In the system, some events are triggered that come, for example, from the IDKG (magnetic card reader), from the EPP, and from the application and are shown in a simplified form in the illustration. If it can be established that these events occur in a specific sequence and at specific time intervals, an alarm regarding suspicious activity should be triggered. The automated teller machine changes its state.

Weightings for the attack patterns should be taken into account when designing the model. The weighting is a further input variable that describes the plausibility of the sources identified (Dempster-Shafer methodology).

The evidence theory of Dempster and Shafer (see also Wikipedia) is a mathematical theory from the field of probability theory. It is used to combine information from different sources into an overall statement, where the plausibility of these sources in taken into account in the calculation.

An evidence can be regarded as an extension of a probability, where, instead of a one-dimensional mass (degree of belief), a two-dimensional mass is used that is made up of the degree of trust or the degree of confidence that the statement from a source is accurate (degree of belief) and of the plausibility of the event, or from a range of probability with a lower and an upper bound.

Evidence theory is used primarily where uncertain statements from different sources have to be combined into an overall statement. There are applications, for example in pattern recognition, in which statements from different, unreliable algorithms can be combined by means of evidence theory in order to obtain a statement, the accuracy of which is better than that of each individual statement.

The following points must be taken into consideration in order to implement such an approach.

Identification of all sources of information in the delimited system

Weighting of the sources

Modeling the system states and dependencies

In the example from FIG. 2, the system is restricted to the control panel and its components that are accessible from the outside; however, it is also conceivable to use all components of the self-service device as sources of information. The sources in the case of FIG. 2 are the card reader, the EPP, the cash dispensing drawer and the display with the function buttons, and a timer. They provide information, or events, that arise through direct interaction of the self-service device user with the automated teller machine or events that arise as the result of a preceding interaction. These events are passed on to the software platform and, as required, to the application.

In a first step, possible and necessary, possibly additional, sources of information within the delimited system have to be identified. Basically, it can be established that identified sources of information provide events or information about a system state as input values for a recognition system. These values are, as a rule, Boolean values.

On the basis of the events/system states identified and their dependencies, patterns are created that form the basis for the pattern recognition of the anomaly recognition system.

Possible systems that are suitable for an anomaly recognition system can be forward-linked systems (JRules, Jess, Drools). For diagnostic and service purposes a rules-based system is investigated. JRules is a business logic system that allows the user to define rules that reflect the business logic. The rule-based engine Jess (Java Expert System Shell) also serves to provide a compromise using defined rules (http://www.jessrules.com/jess/index/shtml). Drools is a Business Rule Management System (BRMS) with a forward-linked, inference-based rules engine that uses an improved implementation of the Rete algorithm.

An important aspect is the linking of the anomaly recognition system for known threat scenarios to corresponding hardware components. A fact adapter is used in the preferred embodiment that represents a uniform interface of the anomaly recognition system to the hardware components. One of the primary tasks of the adapter is to receive the sensor signals of the system components from the device driver layer and to prepare them as facts and patterns for the rules set.

Figure 3:
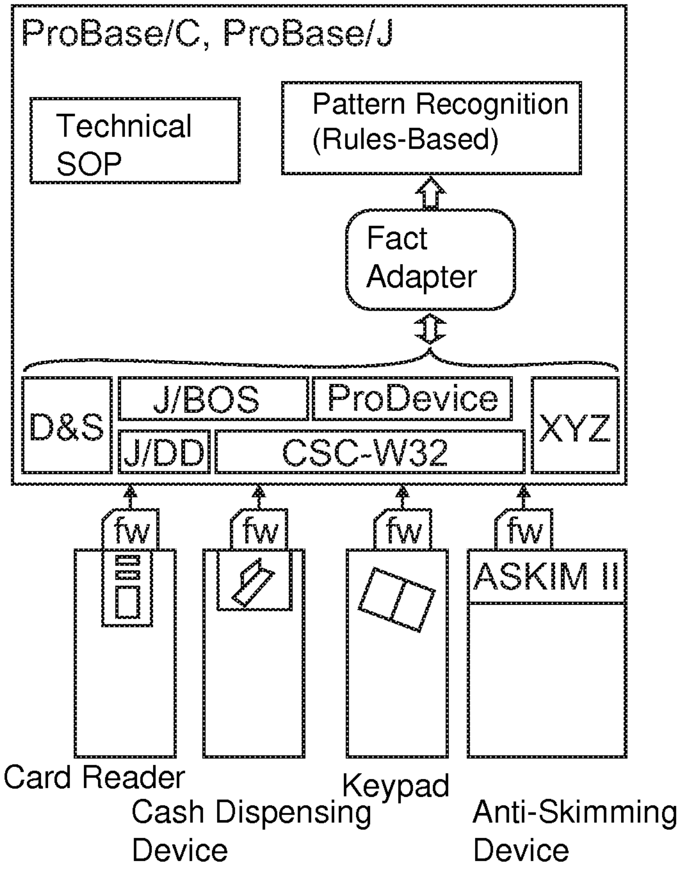
FIG. 3 shows the interfaces of the fact adapter.

FIG. 3 represents the layer structure of the present invention. Through additional software levels, the fact adapter usually accesses the hardware components, such as the card reader, cash dispensing drawer, keypad, and anti-skimming device. These components are controlled by drivers that provide an interface for the fact adapter.

The components for hardware control are grouped in the ProBase module and were superimposed on the operating system. Depending on the programming, it can be ProBase in C or in Java, for example. These are represented by the corresponding ProBaseC and ProBaseJ. Regarding the operating system, it can be Linux, Unix or Windows. Using the ProBase approach, the various hardware drivers are launched in order to provide the functionality of the keypad or the magnetic disk reader. Basic security and operating services are located on this level. The integrated abstraction level ensures that ProBase can communicate with every application. This guarantees a genuinely multi-vendor-capable basic software.

Additional components that build on the hardware drivers are J/BOS, which is a Java-based software platform to control bank peripheral in the front office. The fact adapter, which routes the data to rules-based pattern recognition, is now integrated into the ProBase module. The fact adapter can access the components on different levels. Either the drivers directly or intermediate layers for J/Bos, for example. The fact adapter can thus access each level, access to the administration system over a network is also possible in order to obtain additional information.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for recognizing attacks on a self-service machine that has a series of components, comprising the steps:

Identifying all sources of information in the self-service machine and weighting the sources of information with a two-dimensional input variable that includes a variable degree of confidence value corresponding to a degree of confidence that a statement from the corresponding source is accurate and a plausibility of an event value selected from a range of probabilities with a lower bound and an upper bound;

Modeling the self-service machine with a system of rules that includes states and events of the components, based on the identified sources of information and the weighting;

Monitoring the states and events of the components by a monitoring unit;

Applying the system of rules stored on a memory system to the states and events through a processing unit that loads the system of rules from the memory system and receives the information from the monitoring unit;

Checking whether the system of rules has determined an attack through the processing unit by applying the system of rules and the states and events to each other in order to report said attack to a message system.

2. The method from claim 1, wherein the system of rules is context modeling that maps elementary patterns and events up to and including more complex patterns.

3. The method from claim 1, wherein input values, which are preferably shown as Boolean values, are events or information about a system state.

4. The method from claim 1, wherein, on the basis of the events and system states and their dependencies, patterns are created that are the foundation for the pattern recognition of an anomaly recognition system.

5. The method from claim 1, wherein the events and system states are weighted so that the plausibility of the sources identified is described.

6. The method from claim 1, wherein the Dempster-Shafer method is used.

7. The method from claim 1, wherein forward-linked systems, such as JRules, Jess and/or Drools, are employed as possible anomaly recognition systems.

8. The method from claim 1 wherein a fact adapter is employed that represents a uniform interface of the anomaly recognition system to the components by interposing an abstraction layer between the anomaly recognition system and a device driver layer of the components.

9. The method from claim 8, wherein the fact adapter receives system component sensor signals from the device driver layer and provides said signals as facts, patterns for the rules system/anomaly recognition system.

10. The method from claim 8, wherein the fact adapter is implemented through selected device drivers and image recognition mechanisms.

11. The method from claim 1, wherein image recognition, or image processing, systems and an integration of AI (artificial intelligence) components work together, which are able to identify and classify recognized cases from consolidated sensor signals after a learning period.

12. The method from claim 1, wherein one or more of the following devices provide information as states and events: PIN pad, card reader, cash dispensing drawer, monitor/display with soft key, touch screen, protective barrier against speech recognition, anti-skimming module, clock, proximity sensor, temperature sensor, administrative components that monitor and administer network interfaces, USB, serial interfaces.

13. A device for recognizing attacks on a self-service machine that consists of a series of components, comprising:

a monitoring unit that is configured to monitor states and events of the components, processing unit that receives states and events transmitted by the monitoring unit and that loads a system of rules stored on a memory system in order to check the states and events by applying the system of rules and in order to determine whether the system of rules has identified an attack in order to issue said attack as a message, the system of rules being based on identified sources of information in the self-service machine and a weighting of the identified sources of information, the weighting being a two-dimensional input variable that includes a variable degree of confidence value corresponding to a degree of confidence that a statement from the corresponding source is accurate and a plausibility of an event value selected from a range of probabilities with a lower bound and an upper bound.

14. The device from claim 13 for the device, wherein the memory system stores the system of rules as correlations modeling that maps elementary patterns and events up to and including more complex patterns.

15. The device from claim 13 for the device, wherein input values are events or information about a system state that are preferably shown as Boolean values.

16. The device from claim 13 for the device, wherein an anomaly recognition system detects a pattern on the basis of the events and system states and their dependencies.

17. The device from claim 13 for the device, wherein the anomaly recognition system weights the events and system states so that the plausibility of the identified sources is described.

18. The device from claim 13 for the device, wherein the anomaly recognition system uses the Dempster-Shafer method.

19. The device from claim 13 for the device, wherein the anomaly recognition system employs forward-linked systems such as JRules, Jess, and/or Drools.

20. The device from claim 13 wherein a fact adapter is employed that provides a uniform interface of the anomaly recognition system to the components by interposing an abstraction layer between the anomaly recognition system and a device driver layer of the components.

21. The device from claim 20 for the device, wherein the fact adapter is configured such that it receives system component sensor signals from the device driver layer and provides said signals as facts and patterns for the rules system/anomaly recognition system.

22. The device from claim 20 for the device, wherein the fact adapter is implemented through selected device drivers and image recognition mechanisms.

23. The device from claim 13 for the device, wherein image recognition, or image processing, systems and an integration of AI (artificial intelligence) components work together in such a manner that, after a learning phase, they are capable of identifying and classifying recognized incidents from consolidated sensor signals.

24. The device from claim 13 for the device, wherein one or more of the following devices provide information as states and events: PIN pad, card reader, cash dispensing drawer, monitor/display with soft key, touch screen, protective barrier against speech recognition, anti-skimming module, clock, proximity sensor, temperature sensor, administrative components that monitor and administer the self-service machine over a network, network interfaces, USB, serial interfaces.

25. A method for recognizing attacks on a self-service machine that has a series of components, comprising the steps:

Identifying all sources of information in the self-service machine and weighting the sources of information with a two-dimensional input variable that includes a variable degree of confidence value corresponding to a degree of confidence that a statement from the corresponding source is accurate and a plausibility of an event value selected from a range of probabilities with a lower bound and an upper bound;

modeling the self-service machine with a system of rules that includes states and events of the components, based on the identified sources of information and the weighting;

monitoring the states and events of the components by a monitoring unit;

applying the system of rules stored on a memory system to the states and events through a processing unit that loads the system of rules from the memory system and receives the information from the monitoring unit; and checking whether the system of rules has determined an attack through the processing unit by applying the system of rules and the states and events to each other in order to report said attack to a message system;

wherein the system of rules is context modeling that maps elementary patterns and events up to and including more complex patterns;

wherein, on the basis of the events and system states and their dependencies, patterns are created that are the foundation for the pattern recognition of an anomaly recognition system; and wherein a fact adapter is employed that represents a uniform interface of the anomaly recognition system to the components by interposing an abstraction layer superimposed on an operating system of the self-service machine, between the anomaly recognition system and a device driver layer of the components to allow the operating system to communicate with a plurality of applications from multiple vendors, the fact adapter being configured to receive sensor signals from the components of the device driver layer and to prepare the sensor signals as facts and patterns for the system of rules.

26. A device for recognizing attacks on a self-service machine that consists of a series of components, comprising:

a monitoring unit that is configured to monitor states and events of the components, processing unit that receives states and events transmitted by the monitoring unit and that loads a system of rules stored on a memory system in order to check the states and events by applying the system of rules and in order to determine whether the system of rules has identified an attack in order to issue said attack as a message, the system of rules being based on identified sources of information in the self-service machine and a weighting of the identified sources of information, the weighting being a two-dimensional input variable that includes a variable degree of confidence value corresponding to a degree of confidence that a statement from the corresponding source is accurate and a plausibility of an event value selected from a range of probabilities with a lower bound and an upper bound;

wherein the memory system stores the system of rules as correlations modeling that maps elementary patterns and events up to and including more complex patterns, the correlations modeling being based on identified sources of information in the self-service machine and a weighting of the identified sources of information;

wherein an anomaly recognition system detects a pattern on the basis of the events and system states and their dependencies;

wherein a fact adapter is employed that provides a uniform interface of the anomaly recognition system to the components by interposing an abstraction layer superimposed on an operating system of the self-service machine, between the anomaly recognition system and a device driver layer of the components to allow the operating system to communicate with a plurality of applications from multiple vendors, the fact adapter being configured to receive sensor signals from the components of the device driver layer and to prepare the sensor signals as facts and patterns for the system of rules.

* * * * *